Patented Aug. 23, 1932

1,873,913

UNITED STATES PATENT OFFICE

WILLIAM B. WESCOTT, OF BOSTON, MASSACHUSETTS, ASSIGNOR TO DEWEY AND ALMY CHEMICAL COMPANY, OF CAMBRIDGE, MASSACHUSETTS, A CORPORATION OF MASSACHUSETTS

COAGULATION OF RUBBER

No Drawing. Application filed June 10, 1930. Serial No. 460,304.

This invention relates to the coagulation of rubber from aqueous dispersions, of which commercial latex is a representative, and has for its object a control of the coagulation thereof whereby a uniformly distributed coagulation may be obtained. In the practice of the process the rubber, a coagulant thereof and a protective against coagulation (as well as other dispersible substances if they be employed) are equally and uniformly dispersed preferably in a watery vehicle and thereafter, by effecting a predetermined change of condition, the coagulant is released or activated, as it were, to react on the rubber and to effect a distributed coagulation.

A preferred agent to restrain rubber-coagulation may be any of the denaturable or coagulable proteid protective colloids, as represented by egg-albumen, serum-albumen, or hemoglobin. The coagulant of latex rubber employed may be liquid, or a solid in finely divided particle form and therefore uniformly dispersible in the aqueous suspension. The agent for coagulating or denaturing the proteid protective is preferably heat. Thus, the salient characteristic of the process is the controlled nullification or destruction of the protective effect of denaturable protective colloids associated with an aqueous rubber dispersion in the presence of a coagulant dispersed therein, to expose the dispersed rubber to the coagulant from which it has previously been protected.

The albumens and globulins are particularly valuable in that they afford effective protection against mechanical as well as acid coagulation and also against coagulation produced by materials which, even in the presence of alkalies such as ammonia, coagulate latex rubber. Thus, carbon black, vulcanized rubber scrap, fibrated rubber-frictioned material, and asbestos, all of which cause coagulation of ammoniacal latex; are restrained from such action if the latex contain a dispersed suitable proportion of a soluble proteid.

The present proccess may be exemplified in sundry modes, variant in details but fundamentally alike. For example, the materials employed may be latex, (e. g. normal ammoniacal latex), a heat-coagulable protective proteid (e. g. hemoglobin) and a coagulant of the latex such as acetic acid. The adequate proportion of protective—in relation to the acid or coagulant to be added—having been first dispersed in the aqueous vehicle of the rubber dispersion, and the acid having been introduced and also uniformly admixed therewith, if then the total fluid mix be heated in such manner that the rise of temperature is substantially uniform in rate throughout, when the critical temperature is reached at which the protective effect of the proteid ceases, the rubber coagulant acts simultaneously throughout the dispersed rubber. If the prepared mix be dilute with respect to the latex globules there results a cream of small dispersed coagula. With increase in concentration of the prepared mix, the coagula tend to become larger, and may unite in a coherent coagulum. The liquid constituent of such dispersed coagula or coherent coagulum may be in large part removed by gravity, filtration or centrifuging, much reducing the time required for drying the rubber coagula.

Any comminuted solid materials, granular, powdered, or fibrous, may be introduced into a mix such as above described, provided they be not themselves coagulants or denaturants of the protective proteid; when the critical temperature is reached, at which the coagulant of rubber is released from restraint by the protective, the solid particles in the mix become uniformly entrained or entangled in the network of rubber coagulum. The watery component clarifies, and may be removed to a great extent by centrifuging or filtration.

Or, the coagulant of the rubber may be itself a comminuted solid material, as for instance zinc oxide, carbon black, vulcanized rubber scrap, or fibrated frictioned material which carries rubber with which it was originally impregnated. If solid material, itself a coagulant of latex, be suspended in particle form in a hemoglobin-protected latex, and kept distributed, as by agitation, the temperature of the aggregate being below that at which the hemoglobin itself coagulates or is denatured, so that it is effective to protect the latex rubber against the coagulant; and if then the temperature of the aggregate be raised to the coagulation point or denaturing temperature of the hemoglobin, the coagulant substance is released for action, and the rubber then undergoes a distributed coagulation, surrounding the solid particles, be they granules or fibers.

Thus, a distributed, as contrasted with a localized, coagulation of rubber may be obtained by this process; either a formation of distributed coagula of rubber with no associated solids; or of distributed coagula entraining or enclosing soild particles which are not in themselves coagulant of rubber a coagulant material being distributed in the prepared dispersion); or of distributed coagula surrounding particles of solid material which in itself is a rubber coagulant, either with or without non-coagulant solids in particle form.

If the latex used as starting material be of fairly high concentration, the coagula may form in effect a single coherent coagulum which will, however, be uniform throughout, because of this simultaneous coagulant action which takes place throughout the entire prepared dispersion, at the moment when the protective proteid, by reason of temperature increase is broken down or affected so that it ceases to be effective against the coagulant substance distributed through the dispersion.

When a coherent coagulum is to be formed and particularly when it is to contain a large proportion of fiber or other filler materials, it is desirable to effect the coagulation in a vessel of the approximate shape of the desired end product. After coagulation, the shaped, coherently solidified mass may be subjected to pressure for the ready removal of the major portion of the watery component and thereafter dried and further compressed if desired.

The herein described process is regarded as of particular value in the formation of dispersed coagula by means of solid coagulant substance, distributed through latex in particle form, and in the production of a uniform mutual association of coagula and such solid particles, whether powdered, granular, or fibrous. If the latex concentration be about that of normal commercial ammoniated latex, i. e., 30% to 35%, and the coagulant material is present in sufficient quantity, the coagulum formed at the critical temperature will be coherent, uniform, and uniformly associated with the particles of coagulant substance. If the latex be diluted, say to 10% concentration or less, then in the presence of sufficient coagulant solid particles, the rubber globules will (when the protective proteid is coagulated or denatured) aggregate around the solid particles, but nevertheless leave them in dispersed or scattered condition, while the latex liquid will become clear and the associated rubber and solid particles may be recovered from the slurry in a nearly dry state by centrifuging or filtering. Under these circumstances the recovered material does not tend to cohere unless subjected to heat or pressure, or both together. If a strong acid is added to the slurry of rubber coated particles, a coherent clot will result. No theory is advanced as to the rôle played by the proteid after its coagulation or denaturing, but observation of the fact may be made that discrete non-coherent rubber-associated particles may be obtained by the herein described process. This fact I regard as particularly significant and valuable when coagulant fibrous material is, by this process, entangled with or environed by rubber coagula; this matter is more completely set forth in my application for United States Patent, Serial No. 460,305 filed by me concurrently herewith. Any finely divided solid material, coagulant of latex-rubber, will function in the manner herein described, and will be controlled in its coagulative action in the manner described.

Whereas clean cotton fiber, such as linters, has no coagulant effect upon rubber dispersions in their usual condition or after preservation with ammonia, if such fiber be distributed in a proteid-protected latex along with finely divided coagulants such as zinc oxid or zinc hydroxide, the coagulant effect of the zinc compound, when the protective character of the proteid is destroyed, as by heat, is to produce a formation of rubber coagula among and about the fibers. Microscopic examination of cotton linters so treated discloses the fact that the rubber is associated with the fibers not as a deposited film, but as attached or entrained nodules of minute coagula; these, I believe, are formed upon particles of zinc oxid, which then become engaged with or entangled by the fiber. A preferable mode of distributively associating rubber with fibers which are not of a substance itself a coagulant of latex, is to saturate or coat the fibers with coagulant substance. Fibers thus prepared, and used in the process herein described become mutually distributed with rubber coagula as do fibers or other particles of material inherently coagulative of latex.

The amount of protective proteid to be supplied in any given case will be governed by the coagulative strength of the coagulant of rubber employed; it may vary from 2% to 25% on the rubber quantity.

Instead of utilizing heat as the protein denaturant, coagulation of the protein protective may be brought about by means of substances coagulative of proteins such as formaldehyde, etc., stirred into the aggregate dispersion.

I claim:

1. Method of forming rubber-coagula from latex, characterized by dispersion of a heat-denaturable porteid through the latex under temperature conditions which constitute it an effective protective against a latex-coagulant substance, distributing said latex-coagulant substance through the latex, then raising the temperature of the thus formed aggregate to a point at which the proteid ceases to be protective against said coagulant substance.

2. Method of forming rubber-coagula from latex, characterized by dispersion therein of a heat-denaturable proteid and a latex-coagulant solid material in particle form, under temperature conditions which constitute said proteid an effective protective against said latex-coagulant substance, then raising the temperature of the thus formed aggregate to a point at which the proteid ceases to be protective against said coagulant substance.

3. Method of forming rubber-coagula, characterized by dispersion through a latex of heat-denaturable proteid, a latex-coagulant substance, and solid material in particle form, under temperature conditions which constitute said proteid an effective protective against said latex-coagulant substance, then raising the temperature of the thus formed aggregate to a point at which the proteid ceases to be protective against said coagulant substance.

Signed by me at Cambridge, Massachusetts, this sixth day of June, 1930.

WILLIAM B. WESCOTT.